Jan. 21, 1964   R. G. ERIKSSON   3,118,388
ROTARY MACHINE FOR USE AS A PUMP, COMPRESSOR OR MOTOR
Filed Jan. 31, 1961   2 Sheets-Sheet 1
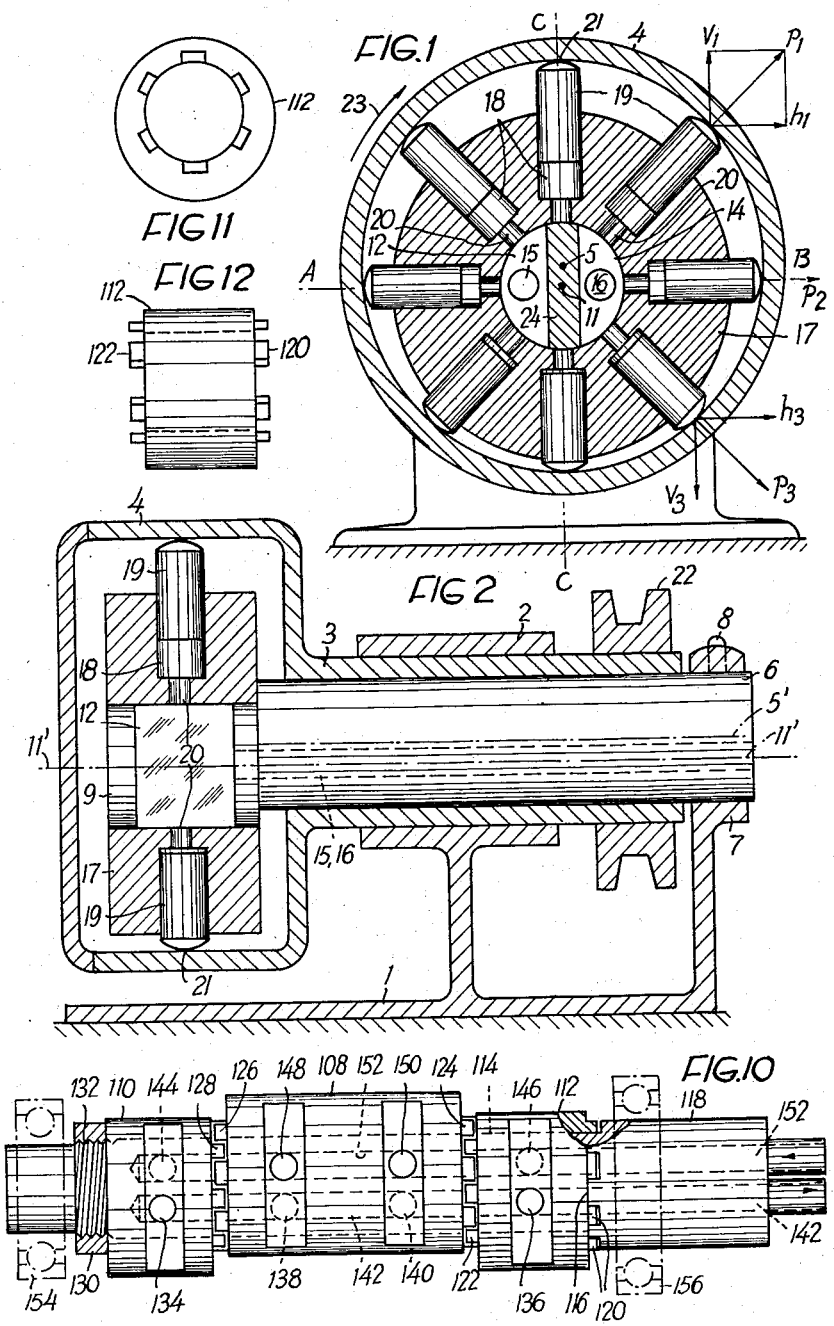
INVENTOR.
ROLF GUSTAF ERIKSSON
BY
ATTY.

Jan. 21, 1964  R. G. ERIKSSON  3,118,388
ROTARY MACHINE FOR USE AS A PUMP, COMPRESSOR OR MOTOR
Filed Jan. 31, 1961  2 Sheets-Sheet 2
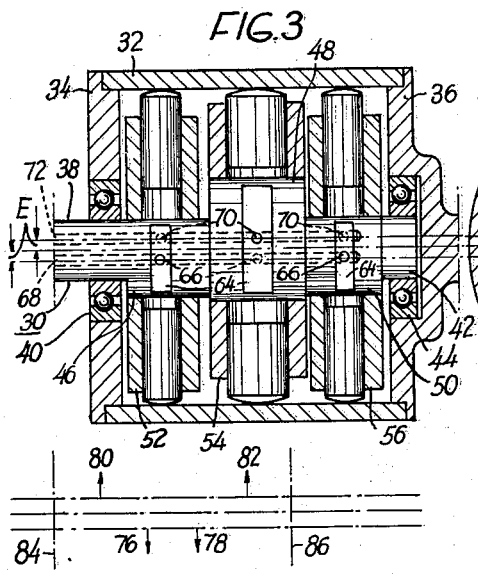
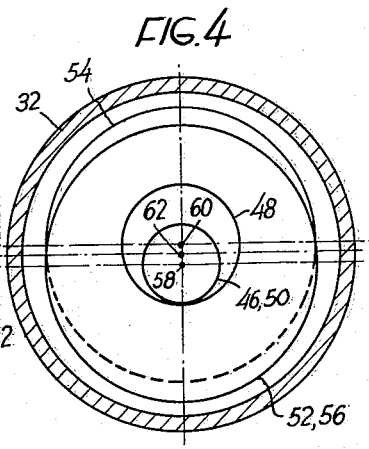
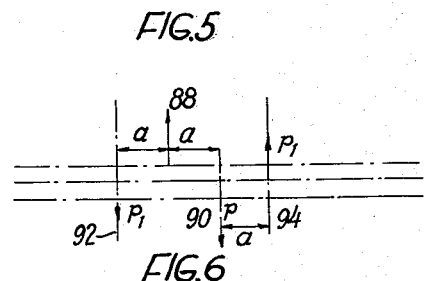
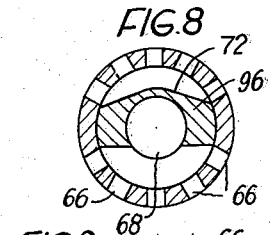
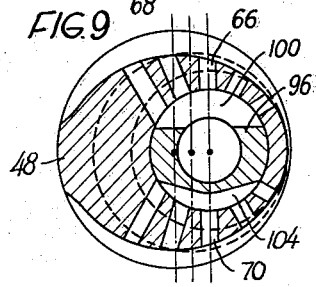
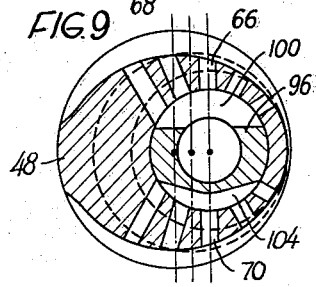
INVENTOR.
ROLF GUSTAF ERIKSSON
BY
Irwin S. Thompson
ATTY.

United States Patent Office 3,118,388
Patented Jan. 21, 1964

3,118,388
ROTARY MACHINE FOR USE AS A PUMP,
COMPRESSOR OR MOTOR
Rolf Gustaf Eriksson, Stockholm, Sweden, assignor to
Gustaf Erik Bjorklund, Stockholm, Sweden
Filed Jan. 31, 1961, Ser. No. 86,050
Claims priority, application Sweden Feb. 8, 1960
7 Claims. (Cl. 103—161)

This invention relates to a rotary machine for use as a pump, compressor or motor and comprising a centrally disposed pintle valve shaft and a plurality of cylinder blocks mounted for rotation on the pintle valve shaft and having cylinder spaces for reciprocable pistons, and wherein the pintle valve shaft has suction ducts and pressure ducts communicating with the cylinder spaces, the ports of the suction and pressure ducts in the pintle valve shaft at one cylinder block being angularly displaced with respect to the suction and pressure ducts at another cylinder block.

In operation, a machine of the type indicated has suction sides and pressure sides located on either side of diametrical planes through the cylinder blocks. The pressure differences between the pressure sides and suction sides can amount to considerable values and give rise to special problems regarding the support of the cylinder blocks and other parts of the machine. In order to obtain a high efficiency, it is desirable to reduce the friction losses as far as possible and to use anti-friction bearings for this purpose. However, this is not always possible in view of the great forces originating from the pressure differences between the pressure sides and suction sides.

The present invention has for its object to solve this problem by such a design of a machine of the type in consideration as to obtain a substantial balance of the above named forces. In its broadest aspect, the invention is characterized in that the cylinder blocks are surrounded by a common ring which rotates together with the blocks and is freely engaged by the pistons and the axis of rotation of which is eccentric with respect to the axis of the pintle valve shaft, the relative angularly displacement of the ports of the suction and pressure ducts of the various cylinder blocks and, consequently, the angular displacement of the pressure and suction sides of the cylinder blocks being such that pressure forces acting between the pistons and the common ring entirely or partly balance each other. According to a suitable construction of the pintle valve shaft and the cylinder blocks, the relative angular displacement of the pressure sides of two cylinder blocks mounted adjacent each other on the same valve shaft equals 180°. Various arrangements of the cylinder blocks on the pintle valve shaft are conceivable, depending upon the number of cylinder blocks provided on the same pintle valve shaft. Several examples of such arrangements are described hereinbelow with reference to the annexed drawing.

In the drawing, several embodiments of the invention are illustrated together with a simple machine of the type in consideration. FIG. 1 is a cross-sectional view and FIG. 2 a longitudinal sectional view of a simple machine comprising a single cylinder block to explain the principle of operation of the type of machine in question. FIG. 3 is a longitudinal sectional view of an embodiment of the invention and FIG. 4 a diagrammatic end view of the positions of the various cylinder blocks relative to the eccentric ring. FIGS. 5 and 6 are diagrammatic views of different arrangements of the cylinder blocks represented by the resultant forces acting on the pintle valve shaft. FIG. 7 is an enlarged longitudinal sectional view of a pintle valve shaft. FIGS. 8 and 9 are cross-sectional views of the pintle valve shaft along the lines 8—8 and 9—9, respectively, in FIG. 7. FIGS. 10 to 12 illustrate a further embodiment of the invention.

The principle of operation of a machine of the type in question is explained with reference to FIGS. 1 and 2, the machine being assumed to be used as a pump. In FIGS. 1 and 2, reference numeral 1 denotes the frame of the machine, numeral 2 a bearing, numeral 3 a tubular drive shaft mounted in the bearing 2, and numeral 4 an annular driving member which hereinbelow is termed the ring. In FIG. 1, the centre of the drive shaft 3 is indicated at 5, and in FIG. 2 the axis of the drive shaft 3 is indicated by a chain-dotted line 5'. The drive shaft 3 is mounted on a stationary shaft 6 which by means of a locking pin 8 is secured to a bracket 7 on the frame. The shaft 6 extends into the ring 4 and is formed therein with pintle 9 which serves as a pintle valve. The combination of the shaft 6 and the pintle 9 is termed hereinbelow the pintle valve shaft. The pintle 9 of the pintle valve shaft is disposed eccentrically with respect to the inner periphery of the ring 4. In FIG. 1, the centre of the pintle is indicated at 11, and in FIG. 2 its axis is indicated at 11'. The pintle 9 has two diametrically opposite recesses 12 and 14. The recess 12 communicates through a longitudinal duct 15 in the pintle valve shaft with an inlet conduit, not shown, for the working medium, and the other recess 14 communicates through a similar duct 16 with an outlet conduit. A cylinder block 17 is mounted on the pintle 9 of the pintle valve shaft and provided with a plurality of preferably cylindrical recesses or bores 18 extending radially toward the centre 11 and receiving each a piston 19, eight bores being provided in the embodiment illustrated. The pistons are movable outwardly and inwardly in the cylinder bores and are in sealing engagement with the walls thereof. The cylinder spaces located inwardly of the pistons can be put into communication with the recesses 12 and 14 in the pintle 9 through individual openings 20.

In order to have the ring 4 and the cylinder block 17 rotate together around the pintle 9 so as to cause the pistons to reciprocate, locking balls or similar members, such as described in copending application Serial No. 820,233, filed June 15, 1959, may be provided between the outer ends of the pistons and the inside of the ring 4, these locking means being only diagrammatically indicated in the drawing by rounded parts 21.

If the ring 4 is the driving member of the machine and is driven, such as by means of a drive pulley 22 secured to the shaft 3, in the direction indicated by the arrow 23, the machine works as a pump or compressor. The pistons 19 impart rotational movement to the cylinder block 17 due to the locking action at the outer ends of the pistons. Since the cylinder block rotates on the pintle 9 around the centre 11 and since the ring 4 rotates about the centre 5, the pistons 19 will reciprocate in the cylinders 18 during rotation of the machine, and working medium will be drawn in through the duct 15 and the recess 12 on one side of the central portion 24 of the pintle valve shaft and will enter the cylinder spaces 18 at the inner ends of the pistons 19 located on that side. After the pistons have been moved to the other side of the central part 24 the working medium will be forced out of the cylinder spaces and pass into the recess 14 and therefrom be delivered through the duct 16. It will be apparent that the pump has a suction side A located on one side of a diametrical plane indicated by a chain-dotted line C—C which extends midway between the recesses 12 and 14, and a pressure side B on the other side of said plane.

On the pressure side of the machine there arise pressures between the outer ends of the pistons 19 and the surrounding ring 4. The forces acting at these places are directed radially outwardly from the centre 11 of the cylinder block 17 and are represented by arrows $p_1$, $p_2$ and $p_3$. If these forces are resolved into components parallel and at right angles to the plane of symmetry C—C it will be seen that the components $v_1$ and $v_3$ at two of the pistons balance each other, whereas the components $h_1$ and $h_3$ are added to the force $p_2$ acting at right angles to the plane of symmetry. If the pump works against a high pressure the resultant force $h_1+p_2+h_3$ can be very great. In contrast, the forces acting on the suction side are small and usually negligible. The great forces on the pressure side result in high pressures on the bearing surfaces between the shafts 3 and 6, which pressures may cause considerable friction losses. Further, small radial relative movements occur between the pintle valve shaft and the ring. A certain noise of rather high pitch is produced as a result of these movements which are synchronous with the pressure variations acting on the pistons as they move from the pressure side to the suction side and vice versa.

The above inconveniences can be avoided by the provision of a plurality of cylinder blocks on the same pintle valve shaft and within the same eccentric ring and with their pistons in positions in which the resultant forces balance each other. Such an arrangement is shown in FIGS. 3 and 4 in which the common pintle valve shaft is denoted at 30 and the surrounding ring at 32. The ring forms a cylinder and has end walls 34 and 36. The end wall 34 is mounted by means of an anti-friction bearing 40 on one of the central end journals 38 of the pintle valve shaft 30, and the other end wall is mounted by means of an anti-friction bearing 44 on the other central end journal 42 of the pintle valve shaft 30. The pintle shaft 30 has three eccentric pintle valves 46, 48 and 50, and on each of these valves there is mounted a cylinder block with pistons which together may be termed the rotors 52, 54 and 56, respectively. The centres 58 of the pintle valves 46 and 50 are located diametrically opposite the centre 60 of the pintle valve 48 with respect to the axis of rotation 62 of the ring 32. Each pintle valve has diametrically opposite recesses in communication with inlet and outlet ducts for the working medium similar to the arrangement described with reference to FIGS. 1 and 2. In FIG. 3, such a recess is shown at 64 for each pintle valve, and corresponding recesses are provided on the opposite sides of the pintle valve, that is, at the rear of FIG. 3. By means of bores 66 the recesses in front of the pintle valves 46 and 50 of the pintle valve shaft 30 communicate with a common duct 68. This duct also communicates through a bore 66 with the rear side of the intermediate pintle valve 48. In a corresponding manner, bores 70 connect the rear sides of the pintle valves 46 and 50 with a common duct 72 which through a bore 70 communicates with the recess in front of the intermediate pintle valve 48. The arrangement of the ducts 68 and 72 and the bores 66 and 70 is illustrated in detail in FIGS. 7 to 9.

If the rotary piston machine illustrated in FIGS. 3 and 4 is used as a pump and if the duct 68 is the suction duct and 72 is the pressure duct it will be obvious that the suction sides of the rotors 52 and 56 are located on the front side of the pintle valve shaft, as viewed in FIG. 3, and that their pressure sides are located on the rear side of said shaft. The suction side of the intermediate rotor 54 is located on the rear side of the pintle valve shaft and its pressure side is located on the front side of the shaft. Consequently, the forces acting on the pintle valve shaft as a result of the pressures of the pistons of the various rotors against the surrounding ring 32 will act in opposition to each other. If the piston or cylinder area of the intermediate rotor 54 is twice as large as the piston or cylinder area of each of the rotors 52 and 56 which have equal piston or cylinder areas, the forces will entirely balance each other. As a result thereof, the bearings 40 and 44 which otherwise would have to resist the corresponding reaction forces may be in the form of anti-friction bearings of small dimensions and with very small friction losses.

For a complete balance of the forces originating from the various pressures on the suction sides and pressure sides of the rotors it is of course necessary to have the rotors symmetrically arranged. In other words, the side rotors 52 and 56 should be disposed symmetrically with respect to a central diametrical plane through the central rotor 54. However, the invention is not limited to an entirely symmetric arrangement but also includes certain unsymmetrical dispositions with nevertheless reduced pressures on the bearings 40 and 44.

If an even number of rotors are provided on a common valve shaft, they may be disposed as diagrammatically illustrated in FIG. 5 in which the arrows 76 and 78 indicate the positions and the direction of the pressure sides of two intermediate rotors with equal piston areas and the arrows 80 and 82 similarly indicate two side rotors each of which has the same piston area as each of the intermediate rotor. The pressure sides of the rotors 76 and 78 are directed in diametrical opposition to the pressure sides of the rotors 80 and 82, the result being that the forces originating from the pressures of the pistons balance each other. Consequently, the loads on the anti-friction bearings indicated by the chain-dotted lines 84, 86 will be equal to zero.

If only two rotors are provided on the common pintle valve shaft, a complete balance cannot be obtained, but the loads on the bearings can be reduced to a high degree, provided that the pressure sides act in opposite directions as indicated in FIG. 6. The distance $a$ between the two rotors denoted at 88 and 90 is equal to the distance from the nearest ball bearing indicated by the respective chain-dotted line 92 and 94. If the resultant force on the pressure side of each rotor 88, 90 is equal to P, the load $P_1$ on each ball bearing is given by the equation $Pa=P_13$. Hence $$P_1=\frac{P}{3}$$

that is, the load on each bearing equals one third only of the resultant force on the pressure side of each rotor.

In an arrangement of the rotors according to FIGS. 3 and 4 the pintle valve shaft may be constructed as shown in FIGS. 7 to 9. As assumed above, the bores 66 are located on the suction sides of the pintle valves 46, 48 and 50, whereas the bores 70 are located on the corresponding pressure sides. The bores 66 of the central pintle valve 48 are located diametrically opposite with respect to the lateral pintle valves 46, 50. The duct 68 through which the bores 66 communicate with each other is an axial bore in a core 96 secured to the pintle valve shaft which is tubular and has a smooth inner surface 98. Transversely extending recesses 100 are provided in the core directly facing the bores 66. These recesses communicate with the duct 68 and widen outwards toward the pintle valve shaft in which a suitable number of bores 66 may be provided radially to facilitate flow of the working medium. The duct 72 on the pressure side may be formed by a groove 102 in the core 96, which groove extends obliquely from a place 103 facing the bore 70 in the pintle valve 46 to a recess 104 facing the bore 70 of the intermediate pintle valve 48 and from the bore 70 to a recess 106 which faces the bore 70 in the pintle valve 50.

It will be obvious that the pintle valve shaft may be constructed in a different way from that described with reference to FIGS. 7 to 9. For instance, the duct 72 may be formed by a groove in the inner surface of the tubular pintle valve shaft instead of in the outer surface of the core 96.

A further embodiment of the pintle valve shaft is illustrated in FIGS. 10 to 12. Here the eccentric pintle valves have equal diameters so that equal rotor rings can be provided at all places on the pintle valve shaft. The general disposition corresponds to the arrangement diagrammatically illustrated in FIG. 5, that is, the pintle valve shaft is intended to carry four rotors. The intermediate rotors have a common pintle valve 108 and the side rotors have individual pintle valves 110 and 112, respectively. The pintle valves are in the form of eccentric rings which internally snugly fit a smooth shaft portion 114. The shaft has a projection 116 at the place where the smooth shaft portion 114 merges into an enlarged end portion 118 of the shaft. The end faces of the pintle valve 112 are provided with axially projecting lugs 120, 122. The lugs provided at one end of the pintle valve 112 engage corresponding recesses in the projection 116, and the lugs provided at the other end of this pintle valve engage recesses between similar lugs 124 on the adjacent pintle valve 108. These lugs form jaw clutches by means of which the pintle valves are coupled to each other and to the shaft. A similar jaw clutch 126, 128 is provided between the pintle valves 108 and 110. A nut 130 on a threaded portion 132 of the shaft forces the pintle valves 108, 110 and 112 toward the projection 116 so as to keep the jaw clutches in permanent engagement.

Through openings 134, 136 on the front side of the pintle valves 110 and 112 and corresponding openings in the smooth shaft portion 114 as well as through openings 138, 140 on the rear side of the pintle valve 108 and corresponding openings in the shaft portion 114 the recesses of said pintle valves communicate with a common longitudinally extending outlet duct 142. Similarly, openings 144, 146 on the rear side of the pintle valves 110 and 112 and corresponding openings in the shaft portion 114 as well as openings 148, 150 on the front side of the pintle valve 108 and corresponding openings in the shaft portion 114 form a communication between the recesses of these pintle valves and a common longitudinally extending inlet duct 152. Therefrom it follows that the inlet and outlet openings in the pintle valves are placed such as to obtain the distribution of forces illustrated in FIG. 5. Consequently, the pintle valve shaft of the machine is relieved of loads so that it can be carried by simple anti-friction bearings 154, 156.

What I claim is:

1. A rotary machine for use as a pump, compressor or motor, comprising a pintle valve shaft provided with suction ducts and pressure ducts for a working medium, a plurality of cylinder blocks mounted for rotation around the same pintle valve shaft and provided with cylinder spaces, said suction ducts and pressure ducts adapted to open successively through ports into said cylinder spaces, reciprocable pistons slidable in said cylinder spaces, a rotatable ring common to all of said cylinder blocks and having its rotational axis located parallel to and eccentric with respect to the axis of said pintle valve shaft, said ring surrounding all of the cylinder blocks, and rolling locking means for operatively engaging said ring with all of said pistons to rotate together with said cylinder blocks around said pintle valve shaft, said ring being the sole driving or driven member, the ports of the suction and pressure ducts of at least one of the various cylinder blocks being located in diametrically opposite positions around said pintle valve shaft relatively to the ports of the suction and pressure ducts of at least one other cylinder block to obtain balance between the pressure forces of the pistons of the various cylinder blocks acting upon the common ring.

2. A rotary machine for use as a pump, compressor or motor, comprising a pintle valve shaft provided with suction ducts and pressure ducts for a working medium, an odd number of cylinder blocks mounted for rotation around the same pintle valve shaft and provided with cylinder spaces, the total of the cross-sectional areas of the cylinder spaces of an intermediate one of the cylinder blocks being equal to the total of the cross-sectional areas of the cylinder spaces of two cylinder blocks arranged symmetrically on either side of the intermediate cylinder block and having mutually equal cylinder areas, said suction ducts and pressure ducts being adapted to open successively through ports into said cylinder spaces, reciprocable pistons slidable in said cylinder spaces, a rotatable ring common to all of said cylinder blocks and having its rotational axis located parallel to and eccentric with respect to the axis of said pintle valve shaft, said ring surrounding the intermediate cylinder blocks as well as the adjacent cylinder blocks, and rolling locking means for operatively engaging said ring with said pistons to rotate together with said cylinder blocks around said pintle valve shaft, said ring being the sole driving or driven member, the ports of the suction and pressure ducts of the intermediate cylinder blocks being located at opposite sides of said pintle valve shaft as compared with the corresponding ports of their two adjacent cylinder blocks so as to obtain balance between the pressure forces of the pistons acting upon the common ring.

3. A rotary machine for use as a pump, compressor or motor, comprising a pintle valve shaft provided with suction ducts and pressure ducts for a working medium, an even number of cylinder blocks mounted on said pintle valve shaft for rotation around the same and provided with cylinder spaces, said suction ducts and pressure ducts being adapted to open successively through ports into said cylinder spaces and forming a suction side and a pressure side in each cylinder block, reciprocable pistons slidable in said cylinder spaces, a rotatable ring common to all of said cylinder blocks and having its rotational axis located parallel to and eccentric with respect to the axis of said pintle valve shaft, said ring surrounding all of the cylinder blocks, and rolling locking means for operatively engaging said ring with said pistons to rotate together with said cylinder blocks around said pintle valve shaft, said ring being the sole driving or driven member, two of said cylinder blocks having their pressure sides looking in the same direction being disposed symmetrically on either side of a pair of said even number of cylinder blocks having their pressure sides looking in the opposite direction from the first named direction to obtain balance between pressure forces acting between the pistons of the various cylinder blocks and the common ring.

4. A pintle valve shaft for rotary machines of the type comprising a plurality of cylinder blocks with cylinder spaces and reciprocal pistons and adapted to rotate about said pintle valve shaft and a rotatable ring common to all of said cylinder blocks and having its rotational axis located parallel to and eccentric with respect to the axis of said pintle valve shaft, said ring surrounding all of said plurality of cylinder blocks, and rolling locking means for operatively engaging said ring with all of said pistons to rotate together with said cylinder blocks around said pintle valve shaft, said ring being the sole driving or driven member, the pintle valve shaft comprising a core and annular pintle valves mounted eccentrically on the core axially adjacent one another, there being one pintle valve for each cylinder block, each annular pintle valve being provided with an inlet opening and an outlet opening for each cylinder block and the core having a longitudinal inlet duct and a longitudinal outlet duct, all of said inlet openings communicating with said inlet duct to provide for admission of working medium to the cylinder spaces of the cylinder blocks, and all of said outlet openings communicating with said outlet duct to provide for release of working medium from the cylinder spaces of the cylinder blocks in succession as the cylinder blocks rotate in common around the pintle valve shaft.

5. A pintle valve shaft for rotary machines of the type comprising at least three cylinder blocks having cylinder spaces and reciprocal pistons and adapted to rotate about said pintle valve shaft and a rotatable ring common to all of said cylinder blocks and having its rotational axis located parallel to and eccentric with respect to the axis of said pintle valve shaft, said ring surrounding all of said plurality of cylinder blocks, and rolling locking means for operatively engaging said ring with all of said pistons to rotate together with said cylinder blocks around said pintle valve shaft, said ring being the sole driving or driven member, the pintle valve shaft comprising a core having a smooth shaft portion, and annular pintle valves mounted eccentrically on said smooth shaft portion, there being one pintle valve for each cylinder block, means to key said annular pintle valves to the core and means to connect the pintle valves mutually, each annular pintle valve being provided with an inlet opening and an outlet opening and the core having a longitudinal inlet duct and a longitudinal outlet duct, all of said inlet openings communicating with said inlet duct to provide for admission of working medium to the cylinder spaces of the cylinder blocks, and all of said outlet openings communicating with said outlet duct to provide for release of working medium from the cylinder spaces of the cylinder blocks in succession as the cylinder blocks rotate in common around the pintle valve shaft.

6. A pintle valve shaft for rotary machines of the type comprising a plurality of cylinder blocks with cylinder spaces and reciprocal pistons and adapted to rotate about said pintle valve shaft and a rotatable ring common to all of said cylinder blocks and having its rotational axis located parallel to and eccentric with respect to the axis of said pintle valve shaft, said ring surrounding all of said plurality of cylinder blocks, and rolling locking means for operatively engaging said ring with all of said pistons to rotate together with said cylinder blocks around said pintle valve shaft, said ring being the sole driving or driven member, the pintle valve shaft comprising a core and a surrounding body comprising eccentric valve portions, there being one eccentric valve portion for each cylinder block, and means to key said body to the core, each eccentric valve portion being provided with an inlet opening and a diametrically opposite outlet opening and the core having an inlet duct and an outlet duct, said ducts being formed as recesses in the peripheral surface of the core, all of said inlet openings communicating with said inlet duct to provide for admission of working medium to the cylinder spaces of the cylinder blocks, and all of said outlet openings communicating with said outlet ducts to provide for release of working medium from the cylinder spaces of the cylinder blocks in succession as the cylinder blocks rotate in common around the pintle valve shaft.

7. A rotary machine for use as a pump, compressor or motor, comprising a pintle valve shaft provided with suction ducts and pressure ducts for a working medium, a pair of cylinder blocks mounted for rotation around the same pintle valve shaft and provided with cylinder spaces, said suction ducts and pressure ducts adapted to open successively through ports into said cylinder spaces, reciprocable pistons slidable in said cylinder spaces, a rotatable ring common to both of said cylinder blocks and having its rotational axis located parallel to and eccentric with respect to the axis of said pintle valve shaft, said ring surrounding both of said cylinder blocks, and rolling locking means for operatively engaging said ring with all of said pistons to rotate together with said cylinder blocks around said pintle valve shaft, said ring being the sole driving or driven member, the ports of the suction and pressure ducts for one cylinder block being displaced substantially 180° around said pintle valve shaft relatively to the locations of the corresponding ports of the other cylinder block to obtain at least a partial balance between the pressure forces of the pistons of the cylinder blocks acting on the common ring.

References Cited in the file of this patent

UNITED STATES PATENTS

| | | |
|---|---|---|
| 683,834 | Beckfield | Oct. 1, 1901 |
| 720,952 | Nielsen | Feb. 17, 1903 |
| 756,362 | Hazelrigg | Apr. 5, 1904 |
| 932,033 | Krone | Aug. 22, 1909 |
| 988,938 | Hubbard | Apr. 4, 1911 |
| 1,000,539 | Nawer | Aug. 15, 1911 |
| 1,360,128 | MacTaggart et al. | Nov. 23, 1920 |
| 1,502,310 | Magie et al. | July 22, 1924 |
| 1,714,706 | Wilking | May 28, 1929 |
| 2,262,593 | Thomas et al. | Nov. 11, 1941 |
| 2,455,678 | Jennings | Dec. 7, 1948 |
| 2,502,334 | Melchior | Mar. 28, 1950 |
| 2,639,673 | Hadekel | May 26, 1953 |
| 2,646,756 | Peguet et al. | July 28, 1953 |
| 3,036,528 | Klopp | May 29, 1962 |

FOREIGN PATENTS

| | | |
|---|---|---|
| 847,842 | France | Oct. 17, 1939 |
| 986,976 | France | Dec. 20, 1943 |
| 934,293 | France | May 18, 1948 |
| 1,129,133 | France | Jan. 16, 1957 |
| 507,158 | Germany | Aug. 28, 1930 |
| 718,977 | Great Britain | Nov. 24, 1954 |
| 179,122 | Great Britain | May 4, 1922 |
| 357,937 | Italy | Apr. 1, 1938 |